United States Patent
Lee et al.

(10) Patent No.: US 10,019,208 B2
(45) Date of Patent: Jul. 10, 2018

(54) USER TERMINAL APPARATUS AND STATUS INFORMATION DISPLAYING METHOD THEREOF

(71) Applicant: S-PRINTING SOLUTION CO., LTD., Suwon-si, Gyeonggi-do (KR)

(72) Inventors: Yoon-gun Lee, Suwon-si (KR); Jin-myung Joo, Seoul (KR); Yun-mi Ha, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 245 days.

(21) Appl. No.: 13/940,478

(22) Filed: Jul. 12, 2013

(65) Prior Publication Data

US 2014/0108950 A1   Apr. 17, 2014

(30) Foreign Application Priority Data

Oct. 11, 2012   (KR) .................. 10-2012-0113136

(51) Int. Cl.
*G06F 3/0481*   (2013.01)
*G06F 3/12*   (2006.01)
(Continued)

(52) U.S. Cl.
CPC .......... *G06F 3/1259* (2013.01); *G06F 3/0481* (2013.01); *G06F 3/1203* (2013.01);
(Continued)

(58) Field of Classification Search
None
See application file for complete search history.

(56) References Cited

U.S. PATENT DOCUMENTS 6,119,194 A * 9/2000 Miranda ............... G06F 1/3203
  710/306
6,311,294 B1 * 10/2001 Larky et al. .................... 714/44
(Continued)

OTHER PUBLICATIONS

Burgess_NPL ("How to Print from Windows 8 Metro Style Apps") http://www.groovypost.com/howto/print-windows-8-metro-apps/ Aug. 14, 2012.*
(Continued)

*Primary Examiner* — Jennifer N To
*Assistant Examiner* — Beau D Spratt
(74) *Attorney, Agent, or Firm* — Staas & Halsey LLP

(57) ABSTRACT

A user terminal apparatus includes a storage unit to store a hybrid operation system to support a plurality of different types of user interfaces (UIs), a control unit to execute the hybrid operation system, a display unit to selectively display one of the plurality of UIs depending on the execution of the hybrid operation system, an interface unit connected to an image forming apparatus, and an input unit to receive a user command to check status information of the image forming apparatus, wherein the UIs include a first UI that can communicate with the image forming apparatus through a port monitor, and when the user command is input, the control unit stops a function of the port monitor, receives the status information of the image forming apparatus by executing an agent program that is stored in the storage unit, and displays the received status information in the first UI.

17 Claims, 11 Drawing Sheets

(51) Int. Cl.
  *H04N 1/00* (2006.01)
  *G06F 9/451* (2018.01)
(52) U.S. Cl.
  CPC .......... *G06F 3/1229* (2013.01); *G06F 3/1284* (2013.01); *G06F 9/451* (2018.02); *H04N 1/00278* (2013.01); *H04N 1/00477* (2013.01); *H04N 1/00506* (2013.01); *H04N 2201/0013* (2013.01); *H04N 2201/0072* (2013.01)

(56) References Cited

U.S. PATENT DOCUMENTS

| | | | | |
|---|---|---|---|---|
| 6,434,643 | B1* | 8/2002 | Ejiri | G06F 13/126 710/25 |
| 7,159,065 | B1* | 1/2007 | Marlatt | G06F 13/4027 710/100 |
| 2002/0141418 | A1* | 10/2002 | Ben-Dor | H04L 12/40123 370/398 |
| 2005/0265066 | A1* | 12/2005 | Machiyama | H04N 1/00278 365/145 |
| 2008/0052384 | A1* | 2/2008 | Marl | H04L 12/2807 709/223 |
| 2009/0002752 | A1* | 1/2009 | Sugiyama | 358/1.15 |
| 2010/0220354 | A1* | 9/2010 | Honda | 358/1.15 |
| 2011/0022769 | A1* | 1/2011 | Hung | G06F 13/102 710/313 |
| 2011/0116129 | A1* | 5/2011 | Onishi | 358/1.15 |
| 2011/0149341 | A1* | 6/2011 | Ko | G06F 3/1204 358/1.15 |
| 2011/0161531 | A1* | 6/2011 | Katayama | G06F 3/1211 710/14 |
| 2012/0005500 | A1* | 1/2012 | Tamura | G06F 1/3209 713/320 |
| 2012/0050783 | A1* | 3/2012 | Osuki | G06F 3/1204 358/1.14 |

OTHER PUBLICATIONS

Jungo_NPL ("Chapter 3. Win Driver USB Overview") https://web.archive.org/web/20100612170034/http://www.jungo.com/st/support/documentation/windriver/10.2.0/wdusb_manual.mhtml/USB_data_transfer_types.html Jun. 12, 2010.*
Beyond_Logic_NPL("USB in a Nutshell") https://web.archive.org/web/20101101151739/http://www.beyondlogic.org/usbnutshell/usb4.shtml#Isochronous Nov. 1, 2010.*
USB20 Apr. 27 2000 pp. 34-37.*

* cited by examiner

FIG. 8

```
Struct sockaddr_in server_addr, client_addr;
server_addr.sin_family=AF_INET;
server_addr.sin_port=htons(PORT);
server_addr.sin_addr.s_addr=htonl(INADDR_ANY)

if ( (server_sd=socket(AF_INET,SOCK_STREAM,0)) <0) {}     //Creating
socket
if (bind(server_sd,(struct sockaddr*)&server_addr,sizeof(server_addr)) <0) {} //
Binding listen(server_sd,1);
client_len=sizeof(client_addr);

if(client_sd=accept(server_sd,(struct sockaddr *)&client_addr, &client_len))<0)
{} while(1) {
    //get data from Metro UI
    nbyte=read(client_sd, pszInputXML, BUFSIZE);

//Analyse required data
    AnalysisRequestXML(pszInputXML);

//Query information from print device
    ExecuteQuery(pszOutputXML);

//return query result to Metro UI
    write(client_sd, header, sizeof(PHeader));
}
```

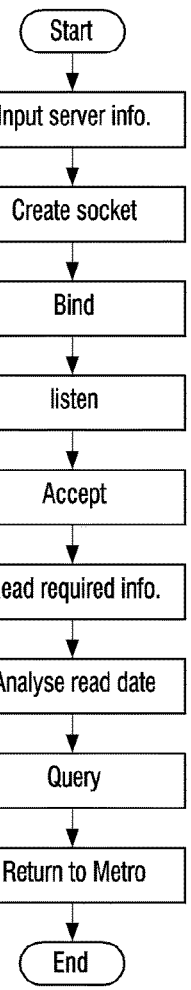

FIG. 9

```xml
<?xml version="1.0" ?>
<AutoConfiguration TYPE="Request" MODEL="ML-551x651x Series'>
    <Config ID="DuplexUnit"/>
    <Config ID="OptionalHDD"/>
    <Config ID="RAMDisk"/>
    <Config ID="Finisher"/>
    <Config ID="MailBox"/>
    <Config ID="EcoPrinting"/>
    <Config ID="LogicalOutputBin"/>
    <Config ID="JobEncryptionPublicKey"/>
    <Config ID="OptionalTray" TRAY34="TRUE" PAPERSIZE="FALSE" PAPERTYPE="FALSE"/>
<AutoConfiguration>
```

FIG. 10

```xml
<?xml version="1.0" ?>
<AutoConfiguration TYPE="Response">
    <Config ID="BuySuppliesWebLink" VALUE="http://www.samsung.com/printer-accessory/CLX-8650ND.psu"/>
    <Config ID="OptionalTray"/>
        <Item NAME="Manual Feeder"/>
        <Item NAME="MP Tray" TRAYTYPE="Standard" PAPERSIZE="Letter" PORTRAIT="TRUE" PAPERTYPE="Normal"/>
        <Item NAME="Tray 1" TRAYTYPE="Standard" PAPERSIZE="A4" PORTRAIT="TRUE" PAPERTYPE="Normal"/>
        <Item NAME="Tray 2" TRAYTYPE="Standard" PAPERSIZE="Letter" PORTRAIT="TRUE" PAPERTYPE="Normal"/>
    </Config>
    <Config ID="OptionalInnerOutputBin" VALUE="0"/>
    <Config ID="Finisher" VALUE="0"/>
    <Config ID="EcoPrinting" VALUE="FALSE">
        <Item NAME="AdminForcedEco" VALUE="FALSE"/>
        <Item NAME="ColorMode" VALUE="FALSE"/>
        <Item NAME="Duplex" VALUE="1" REVERSE="FALSE"/>
        <Item NAME="Nup" VALUE="2" />
        <Item NAME="Quality" VALUE="Best" />
        <Item NAME="SkipBlankPages" VALUE="TRUE" />
        <Item NAME="TonerReductionRatioMono" VALUE="51" />
        <Item NAME="TonerReductionRatioTonerSave" VALUE="0" />
        <Item NAME="Co2FactorForPrintingPaper" VALUE="640" />
        <Item NAME="Co2FactorForEnergyColor" VALUE="12" />
        <Item NAME="Co2FactorForEnergyMono" VALUE="12" />
        <Item NAME="Co2FactorForTonerColor" VALUE="24" />
        <Item NAME="Co2FactorForTonerMono" VALUE="24" />
    </Config >
    <Config ID="SecureReleaseMode" VALUE="1"/>
</AutoConfiguration>
```

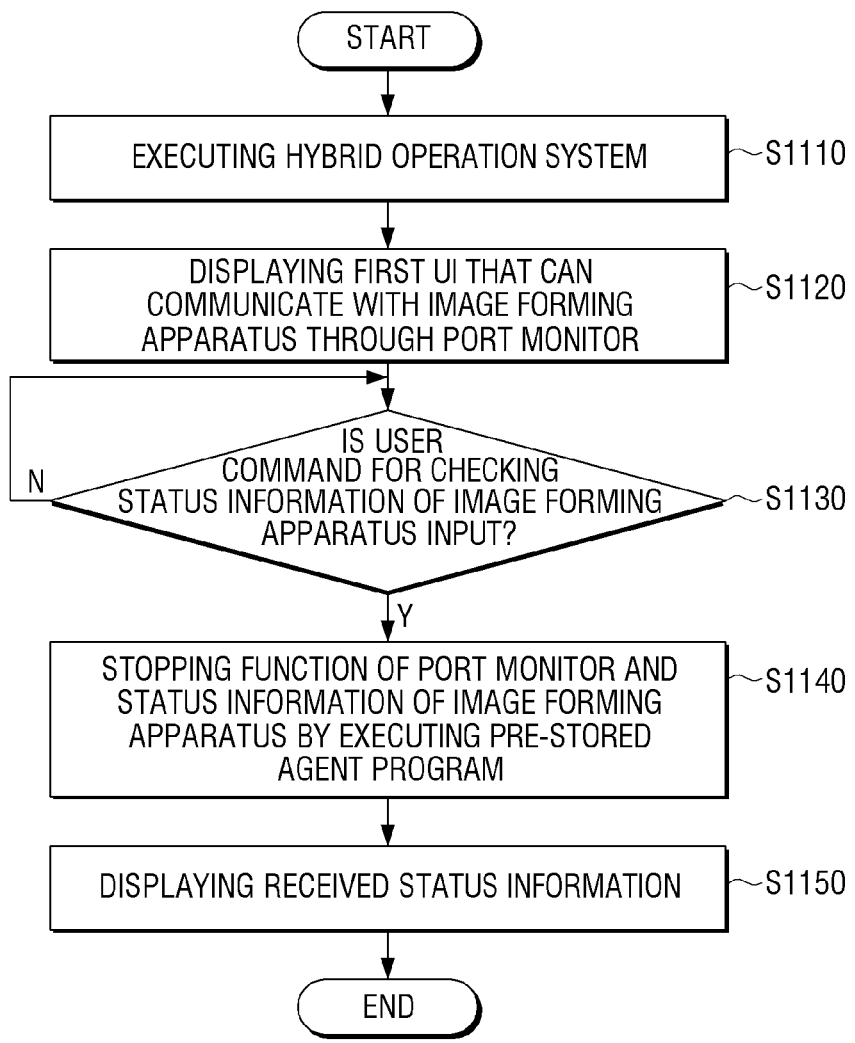

USER TERMINAL APPARATUS AND STATUS INFORMATION DISPLAYING METHOD THEREOF

CROSS-REFERENCE TO RELATED APPLICATIONS

This application claims the benefit of priority under 35 U.S.C. § 119(a) from Korean Patent Application No. 2012-0113136 filed Oct. 11, 2012 in the Korean Intellectual Property Office, the disclosure of which is incorporated herein by reference in its entirety.

BACKGROUND OF THE INVENTION

1. Field of the Invention

The present disclosure relates to a user terminal apparatus and a status information displaying method thereof. More particularly, the present disclosure relates to a user terminal apparatus to receive and display status information of an image forming apparatus upon a user request by executing an agent program, and a status information displaying method thereof.

2. Description of the Related Art

A graphic user interface (GUI) is a computer interface including graphical elements, such as objects, frames, and colors, formed as pictures on a screen of a computer to indicate specific functions and purposes when using the computer.

WINDOWS 8 of the MICROSOFT Co. is a hybrid operating system to support a plurality of different types of user interfaces (UIs), and supports a desktop style UI (or a desktop UI) that has been used in WINDOWS 7 and a new graphic user interface called a metro style UI (or referred to as metro UI, WINDOWS 8 style UI, or tile type UI). Referring to FIGS. 2 and 3, FIG. 2 illustrates the desktop style UI of the WINDOWS 8, and FIG. 3 illustrates the metro style UI of the WINDOWS 8. As illustrated in FIG. 2, the desktop style UI is configured of a window, a taskbar, a start button, icons, etc. The metro style UI, as illustrated in FIG. 3, has a configuration that typography-based multiple rectangles are arranged in the shape of tiles.

The metro style UI and desktop style UI of the Windows 8 (Trademark) have a communication structure of a USB interface set differently.

During communication of the USB interface, the desktop style UI of the Windows 8 (Trademark) supports data transmission channels of bulk, control, interrupt, and isochronous, and can directly transmit status information of the image forming apparatus which a user requests to an application by using the control channel.

However, the metro style UI of the WINDOWS 8 as a separate interface called a port monitor, and is designed so that the user's request for checking the status information of the image forming apparatus can be performed through only the port monitor and the communication can be performed through only the bulk channel.

A method of displaying status information of an image forming apparatus in the metro style UI will be described in detail with reference to FIG. 4. In FIG. 4, a UI can communicate with the image forming apparatus only through the port monitor like the metro style UI.

Referring to FIG. 4, when an application 101 for displaying the status information of the image forming apparatus is executed in the UI by a user, the application 101 of the UI requests a port monitor 102 to check the status information of the image forming apparatus.

Then, the port monitor 102 requests the status information of the image forming apparatus 200 through a communication port 100a by using a bulk channel of a USB interface based on the requested information.

Then, the port monitor 102 reads cached data (configuration) 103 storing the status information received from the image forming apparatus 200, and provides the status information of the image forming apparatus 200 to the application 101 of the UI based on the read cached data 103. Accordingly, the application 101 of the UI can display the status information of the image forming apparatus 200. Here, the cashed data is data stored in a memory (or cache memory) as configuration 103.

After that, the port monitor 102 receives the status information of the image forming apparatus 200 from the image forming apparatus 200 through the communication port 100a, and then, updates the cached data 103.

Depending on a characteristic of the operation, since the application 101 that is run in the UI is provided with the status information of the image forming apparatus 200 based on the cached data 103 that was updated before being requested, there is a problem that the application 101 receives only the status information before being requested. Also, since the communication is performed through the bulk channel, there is another problem that when other application is executed in the UI and uses the bulk channel, the application 101 cannot request and receive the status information of the image forming apparatus 200.

SUMMARY OF THE INVENTION

The present disclosure provides a user terminal apparatus to receive and display status information of an image forming apparatus upon a user request by executing an agent program and a status information displaying method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a user terminal apparatus, which may include a storage unit to store a hybrid operation system to support a plurality of different types of user interfaces (UIs), a control unit to execute the hybrid operation system, a display unit to selectively display one of the plurality of UIs depending on the execution of the hybrid operation system, an interface unit connected to an image forming apparatus, and an input unit to receive a user command to check status information of the image forming apparatus, wherein the UIs include a first UI to communicate with the image forming apparatus through a port monitor among the plurality of UIs, and when the user command is input, the control unit stops a function of the port monitor, receives the status information of the image forming apparatus by executing an agent program that is stored in the storage unit, and displays the received status information in the first UI.

The agent program may receive the status information of the image forming apparatus, may process the received status information into a data format that can be recognized by the first UI, and may provide the processed status information to the first UI.

If the user command is input, the control unit may execute a first application that transmits the user command to the agent program, may receive the status information of the image forming apparatus from the agent program, and then, may display the status information of the image forming apparatus in the first UI, and the first application may work in conjunction with the agent program by a TCP/IP socket.

The interface unit may include a USB interface, and the agent program may access to the image forming apparatus through a control channel of the USB interface.

The operating system may include Windows 8 (Trademark) operating system, and the first UI may include a metro style UI.

The foregoing and/or other features and utilities of the present general inventive concept may also be achieved by providing a status information displaying method of a user terminal apparatus in which a hybrid operation system to support a plurality of different types of user interfaces (UIs) is stored, the status information displaying method including executing the hybrid operation system, displaying a first UI that can communicate with the image forming apparatus through a port monitor among the plurality of UIs, stopping a function of the port monitor when a user command to check status information of the image forming apparatus is input, receiving the status information of the image forming apparatus by executing an agent program that is previously stored, and displaying the received status information in the first UI.

The agent program may receive the status information of the image forming apparatus, may process the received status information into a data format that can be recognized by the first UI, and may provide the processed status information to the first UI.

The receiving the status information of the image forming apparatus may include, if the user command is input, transmitting the user command to the agent program by executing the first application for displaying the status information of the image forming apparatus in the first UI, and receiving the status information of the image forming apparatus depending on the received user command, the displaying the received status information may include allowing the first application to receive and display the received status information from the agent program, and the first application may work in conjunction with the agent program by a TCP/IP socket.

The image forming apparatus may be connected by a USB interface, and the agent program may access to the image forming apparatus through a control channel of the USB interface.

The operating system may include Windows 8 (Trademark) operating system, and the first UI may include a metro style UI.

The foregoing and/or other features and utilities of the present general inventive concept may also be achieved by providing a computer-readable medium to contain computer-readable codes as a program to execute the method describe above or hereinafter.

The foregoing and/or other features and utilities of the present general inventive concept may also be achieved by providing a user terminal apparatus connectable to an external image forming apparatus, including a display unit to display a first user interface, a user input unit to receive a user command to check status information of the image forming apparatus, a metro application configured to communicate with the image forming apparatus using a bulk channel of a USB interface and to receive the user command input from the user input unit, and an agent application configured to communicate with the image forming apparatus through a control channel of the USB interface according to a control of the metro application to receive the status information from the image forming apparatus such that the display unit displays the receive status information in the first user interface.

The user terminal apparatus may further include a port monitor configured to monitor the bulk channel. The metro application may communicate with the image forming apparatus through the port monitor to receive information other than the status information from the image forming apparatus and communicate with the image forming apparatus through the agent application to receive the status information according to the user command to check the status information of the image forming apparatus.

The user terminal apparatus may further include a memory to store previous status information of the image forming apparatus, and the memory may be updated to store the status information received from the image forming apparatus through the agent program.

The display unit may display the received status information rather than the previously stored status information.

The received status information may be different from previous status information stored before the user command is received.

The user terminal apparatus may further include a port monitor configured to communicate with the image forming apparatus, and a control unit to prevent the port monitor from communicating with the image forming apparatus to receive the status information through the bulk channel of the USB interface when the user command is received to check the status information.

The user terminal apparatus may further include a memory to store the agent program, and a control unit to control the agent program to initiate communication with the image forming apparatus when the user command is received to check the status information of the image forming apparatus.

The metro application may operate before and after the user command is input, and the agent application may be loaded to operate when the user command is input to check the status information of the image forming apparatus.

The agent application may be loaded to a desktop application different from the metro application to perform the communication with the image forming apparatus.

BRIEF DESCRIPTION OF THE DRAWINGS

These and/or other features and utilities of the present disclosure will become apparent and more readily appreciated from the following description of the embodiments, taken in conjunction with the accompanying drawings of which:

FIG. 8 is a view illustrating a source code and an execution order of an agent program according to an embodiment of the present general inventive concept;

FIG. 9 is a view illustrating a data format of status information request of an image forming apparatus according to an embodiment of the present general inventive concept;

FIG. 10 is a view for explaining a data format of status information of an image forming apparatus according to an embodiment of the present general inventive concept; and FIG. 11 is a flowchart for explaining a status information displaying method according to an embodiment of the present general inventive concept.

DETAILED DESCRIPTION OF THE PREFERRED EMBODIMENTS

Figure 1:
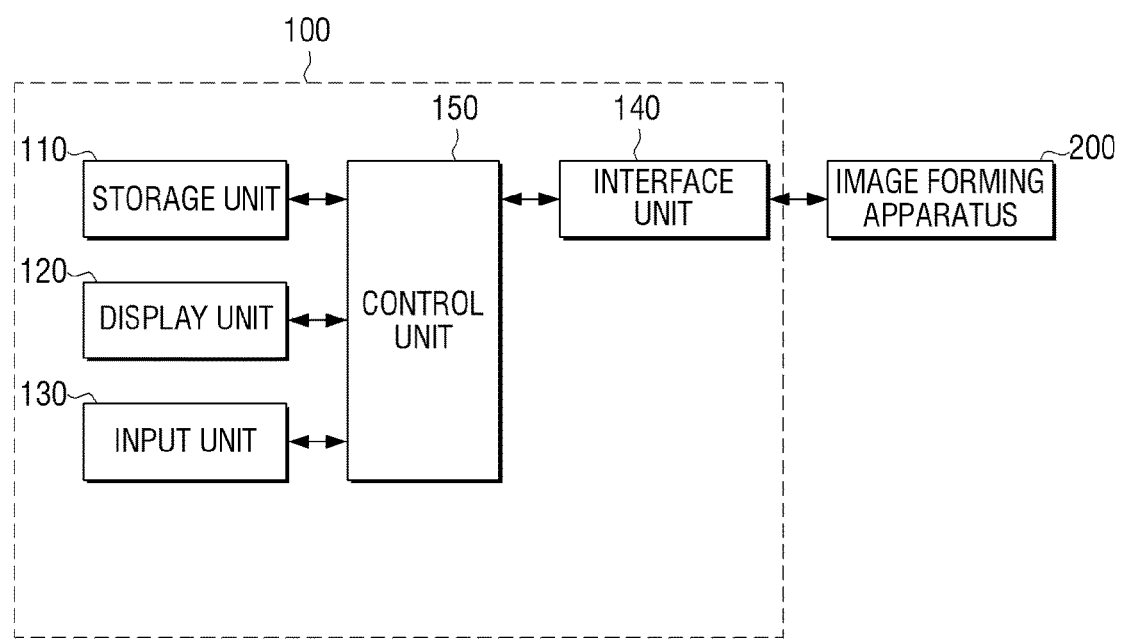
FIG. 1 is a block diagram illustrating a user terminal apparatus according to an embodiment of the present disclosure.
Figure 2:
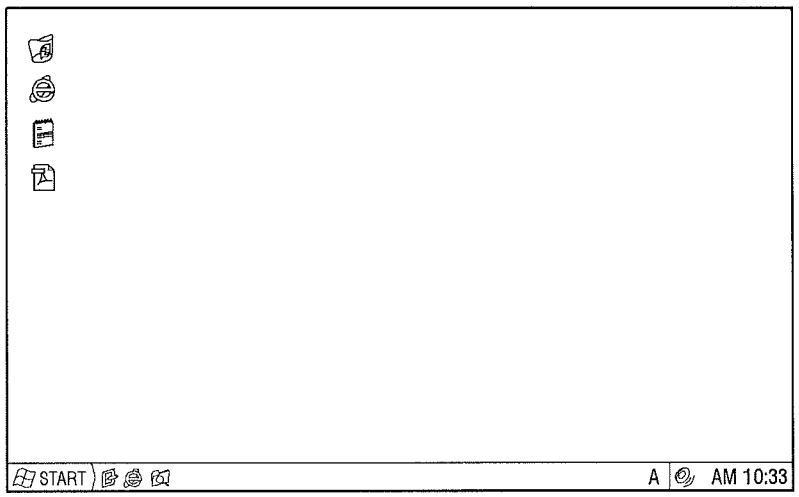
FIG. 2 is a view illustrating a desktop style UI from the related art.
Figure 3:
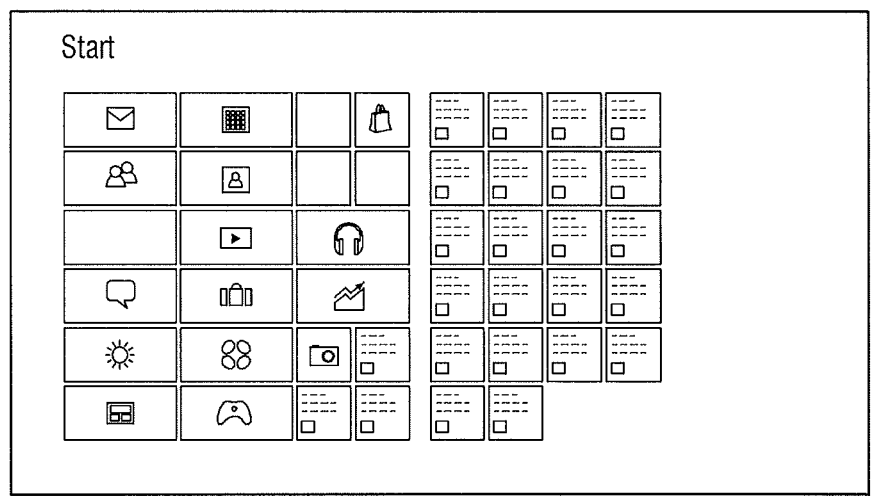
FIG. 3 is a view illustrating a metro style UI from the related art.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIG. 1 is a block diagram illustrating a user terminal apparatus 100 according to an embodiment of the present disclosure.

Referring to FIG. 1, the user terminal apparatus 100 includes a storage unit 110, a display unit 120, an input unit 130, an interface unit 140, and a control unit 150. The image forming apparatus 200 is connected with the user terminal apparatus 100 through the interface unit 140.

The storage unit 110 stores a hybrid operation system to support a plurality of different types of user interfaces (UIs).

The hybrid operation system refers to an operation system that can support the plurality of different types of UIs. The hybrid operation system may be the WINDOWS 8 of MICROSOFT. As described above, the WINDOWS 8 has a new user interface called a metro style UI (or metro UI, WINDOWS 8 style UI, or tile type UI) and a desktop style UI.

In addition, the storage unit 110 may store a variety of programs and data that may be usable to perform an operation of the user terminal apparatus 100. The storage unit 110 may be implemented as a hard disk drive (HDD), a solid state drive (SSD), a flash memory, a USB memory, etc.

The storage unit 110 according to an embodiment of the present disclosure may store an agent program according to an embodiment of the present general inventive concept.

The agent program according to an embodiment of the present disclosure may receive status information of the image forming apparatus 200, may process the received status information into a data format that can be recognized by a first UI, and may provide the processed status information to the first UI. Here, the first UI refers to a UI that can communicate with the image forming apparatus through a port monitor. An example of this may be the metro style UI of the WINDOWS 8.

When receiving a request of the status information of the image forming apparatus 200, the agent program according to an embodiment of the present disclosure may not use a port monitor, but can directly receive the status information of the image forming apparatus 200 through a control channel of a USB interface.

A detailed explanation of the agent program will be described later with reference to drawings below FIG. 5.

As described above, a transmission channel (or mode) of the USB interface includes one or more bulk, control, interrupt, and isochronous channels. Here, the control channel is used for a purpose of building (forming) and maintaining communication between the user terminal 100 and an external device, for example, the image forming apparatus 200, and can be accessed while other application is using the USB interface. However, the bulk channel is a data transmission channel to use all of available bandwidth thereof for sudden non-periodic transmission. Accordingly, if there is no available bandwidth, a delay occurs until another bandwidth becomes available. In this case, when other application is using the USB interface, the bulk channel may not be used.

The display unit 120 selectively displays one of the plurality of UIs depending on execution of the hybrid operation system.

FIG. 1 illustrates the display unit 120 and input unit 130 as separately formed units. However, the present general inventive concept is not limited thereto. It is possible that the display unit 120 and input unit 130 may be formed in a single unit. In this case, the display unit 120 may be implemented as a touch screen that can sense a touch of the user. The display unit 120 may include a touch sensing element (not illustrated) and a display element (not illustrated). The touch sensing element may be implemented as a touch sensor that can sense the touch of the user and a proximity sensor that can detect approach of the user's touch. The display element may be implemented as a liquid crystal display (LCD) panel, etc.

The display unit 120 may display various screens such as a desktop screen, a web browsing screen, an application execution screen, a playing screen of a variety of content, such as videos, photos, etc., a user interface screen, etc.

The input unit 130 may receive a user command for checking the status information of the image forming apparatus 200. In detail, the input unit 130 may receive the user command, and then, may transmit the received user command to the control unit 150. Accordingly, the control unit 150 can perform a control operation corresponding to the user command.

As described above, the input unit 130 may be coupled to the display unit 120, and thus, may be implemented as a touch screen that can simultaneously perform input and output operations. Also, the input unit 130 may be implemented as a keyboard, a mouse, etc.

The interface unit 140 connects the user terminal apparatus 100 to the image forming apparatus 200. The interface unit 140 may support a USB interface, a RS-232 interface, a parallel interface, a wireless interface, etc., to connect the user terminal apparatus 100.

The interface unit 140 may be the USB interface. In this case, the agent program may access to the image forming apparatus 200 through a control channel of the USB interface.

The control unit 150 may execute the hybrid operation system. Also, the control unit to controls the display unit 120 to display a first UI of the plurality of UIs of the hybrid operation system that can communicate with the image forming apparatus 200 through the port monitor. If a user command is input to check the status information of the image forming apparatus 200, the control unit 150 may stop a function of the port monitor, may receive the status information of the image forming apparatus 200 by executing the agent program stored in the storage unit 110, and may display the received status information in the first UI.

When the user command is input to check the status information of the image forming apparatus 200, the control unit 150 may transmit the user command to the agent program, may receive the status information of the image forming apparatus 200 from the agent program, and may run a first application to display the status information of the image forming apparatus 200 in the first UI.

The first application is an application that is executed in the first UI and displays the status information of the image forming apparatus 200. The first application does not use the port monitor, and operates in conjunction with the agent program that directly loads the status information of the image forming apparatus 200 into a control channel.

Here, the first application may work in conjunction with the agent program by a TCP/IP socket.

The control unit 150 may control each of components inside the user terminal apparatus 100.

As described above, the user terminal apparatus 100 according to an embodiment of the present disclosure receives the status information of the image forming apparatus by using the agent program upon a user request (when the user requests the status information), and thus, can display the requested correct status information of the image forming apparatus 200.

Also, two or more applications may be executed in the first UI that uses the port monitor. Accordingly, even when other application uses a bulk channel of the USB interface, the first UI can receive the status information of the image forming apparatus through the control channel by using the agent program.

Figure 5:
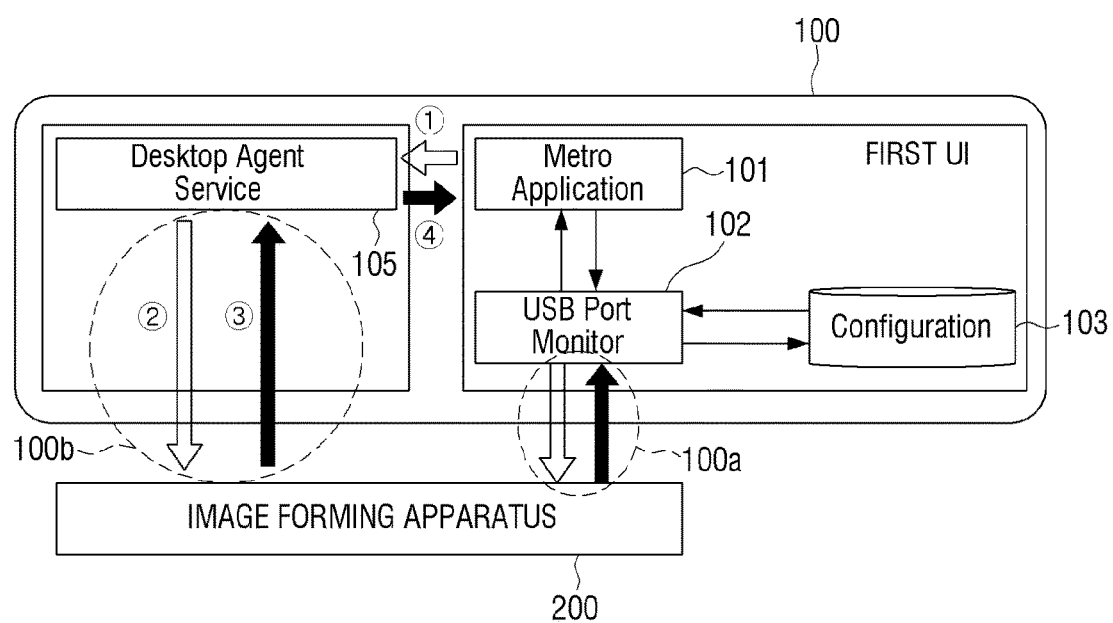
FIG. 5 is a view illustrating an operation of loading status information of an image forming apparatus through an agent program according to an embodiment of the present disclosure.

FIG. 5 is a view illustrating an operation of loading status information of an image forming apparatus 200 in a user terminal 100 through an agent program (for example, desktop agent service) 105 according to an embodiment of the present disclosure. In FIG. 5, a first UI refers to a UI that can communicate with the image forming apparatus through a port monitor 102 (for example, USB port monitor) like the metro style UI through a communication port 102a.

Referring to FIG. 5, when an application 101 (for example, metro application) to display the status information of the image forming apparatus 200 is executed in the first UI by the user, the application 101 of the first UI requests the agent program 105 to check the status information of the image forming apparatus. In this case, the port monitor 102 that controls the USB interface may not operate.

Then, the agent program 105 requests the status information of the image forming apparatus 200 through a communication port 100b by using a control channel of the USB interface based on the requested information. The communication port 100b may be same as the communication port 100a. However, the present general inventive concept is not limited thereto. It is possible that the communication port 100b may be different from the communication port 100a.

Then, after receiving the status information of the image forming apparatus 200 through the communication port 100b by using the control channel of the USB interface, the agent program 105 may provide the status information of the image forming apparatus 200 to the application 101 of the first UI. As a result, the application 101 of the first UI can display the status information of the image forming apparatus 200 received from the agent program 105.

Figure 4:
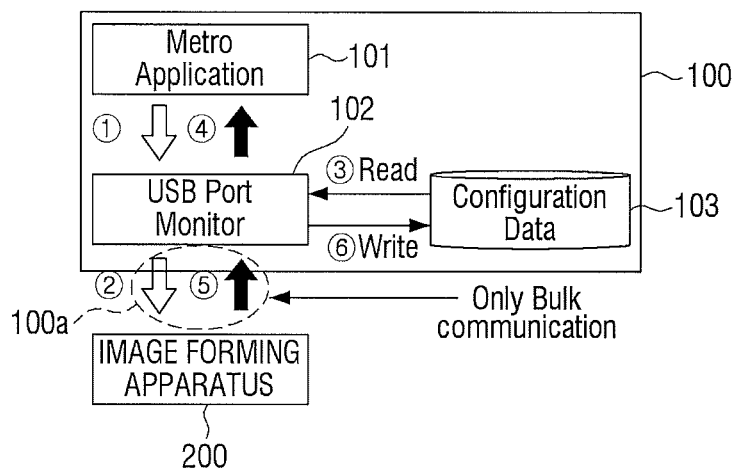
FIG. 4 is a view illustrating an operation of loading status information of an image forming apparatus only through a port monitor of a UI from the related art.

Here, the application 101 of the first UI of FIG. 5 may operate in a similar way to the first application (metro application) of FIG. 4.

According to operations as described above, the application 101 executed in the first UI is provided with the status information of the image forming apparatus 200 based on cached data 103 (configuration) that was previously updated before being requested. Therefore, a problem to receive only the previous status information before being requested may be solved.

Also, since the port monitor 102 performs communication through the bulk channel, when other application is executed in the first UI and uses the bulk channel, there is a problem that the port monitor 102 cannot request and receive current status information of the image forming apparatus 200. However, the present disclosure can solve the problem by using a separate agent program.

Figure 6:
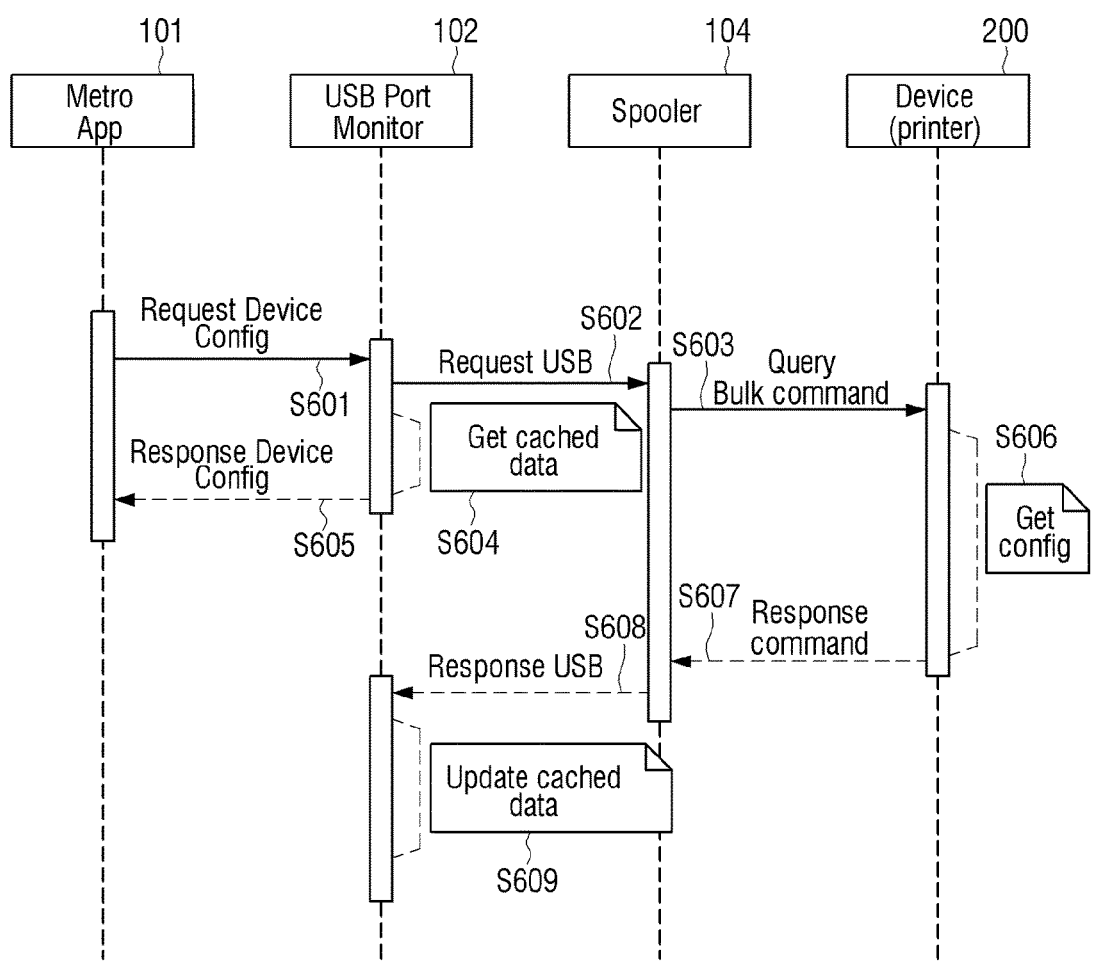
FIG. 6 is a sequence diagram illustrating an operation of loading status information of an image forming apparatus through a port monitor of a first UI.

FIG. 6 is a sequence diagram illustrating an operation of loading status information of an image forming apparatus through a port monitor of a first UI.

Referring to FIG. 6, an application 101 executed in a first UI (for example, metro style UI) requests status information of a device 200 (hereinafter, referred to as an image forming apparatus) to a port monitor 102 depending on a user command in a user terminal apparatus at operation S601. After that, the port monitor 102 transmits the request for the status information of the image forming apparatus 200 to a spooler 104 at operation S602, and thus, the spooler 104 causes the request to wait for until a channel is secured.

The spooler refers to a configuration that enables parallel processing by using the storage unit as a buffer memory in order to overcome a speed difference between the image forming apparatus 200 and the user terminal apparatus.

After the bulk channel of the USB interface is secured, the spooler 104 requests the status information of the image forming apparatus 200 by using the bulk channel at operation S603.

The port monitor 102 provides the previous status information of the image forming apparatus 200 from the cached data that was previously stored before receiving the status information request of the image forming apparatus 200 to the application 101 at operation S605, and then, the application 101 may display the previous status information.

After that, the image forming apparatus 200 obtains the status information at operation S606, and then, responds to the spooler 104 at operation S607. The spooler 104 provides the status information to the port monitor 102.

The port monitor 102 updates the cached data by the provided status information (S609).

Although FIG. 6 illustrates and describes the port monitor 102 and the separate spooler 104 as separate elements. However, it is possible that the spooler 104 may be configured to be included in the port monitor 102.

According to the above operations, since the application 101 executed in the first UI is provided with the status information of the image forming apparatus 200 based on the cached data 103 that was previously updated before being requested, there is a problem that the application 101 receives only the status information before being requested.

Figure 7:
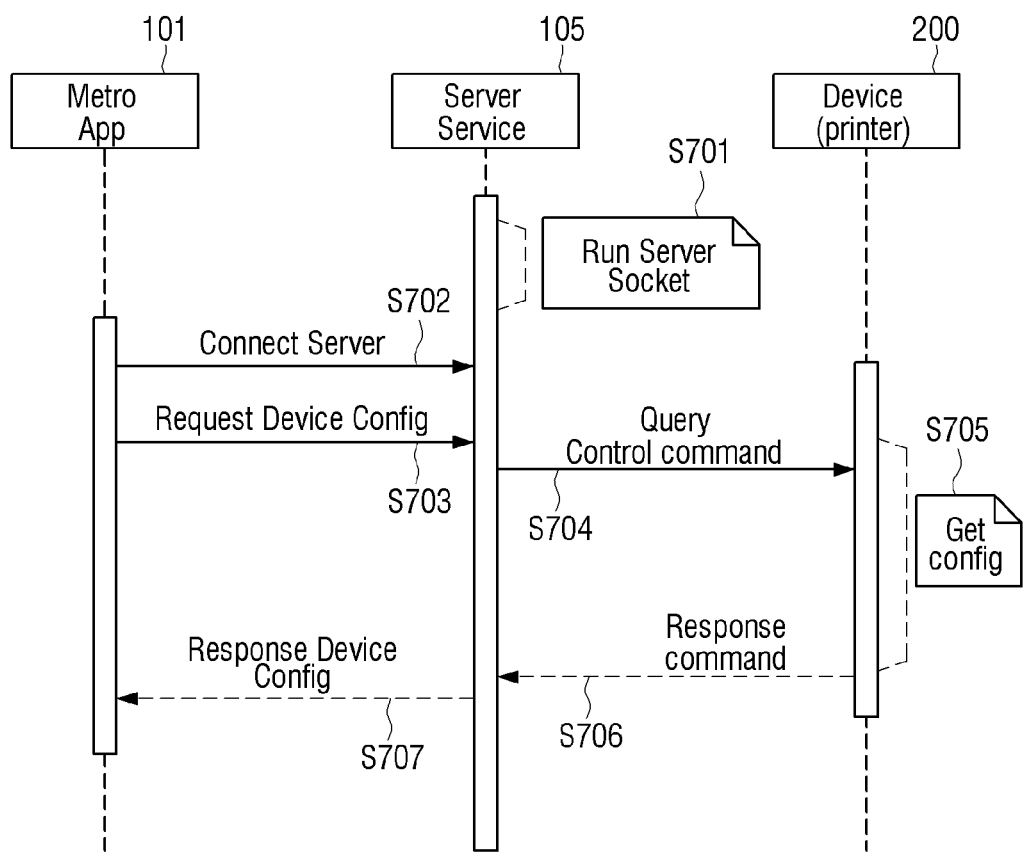
FIG. 7 is a sequence diagram illustrating an operation of loading status information of an image forming apparatus through an agent program according to an embodiment of the present general inventive concept.

FIG. 7 is a sequence diagram illustrating an operation of loading status information of an image forming apparatus through an agent program according to an embodiment of the present disclosure.

Referring to FIG. 7, a sever service 105 (hereinafter, referred to as an agent program) activates a socket in order to communicate with an application 101 that is executed in the first UI (for example, a metro style UI) at operation S701.

Then, the application 101 is connected in operation S702, and then, the application 101 requests status information of a device 200 (hereinafter, referred to as an image forming apparatus) to the server service 105 (hereinafter, referred to as an agent program) depending on a user command at operation S703.

After that, the agent program 105 requests the status information to the image forming apparatus 200 by using the control channel of the USB interface at operation S704.

Then, the image forming apparatus 200 obtains the status information (S705), and then, responds to the agent program 105 at operation S706. The agent program 105 provides the application 101 with the status information at operation S707.

As described above, the user terminal apparatus 100 according to an embodiment of the present disclosure receives the status information of the image forming apparatus upon a user request by using the agent program, and thus, can display current and correct status information of the image forming apparatus.

Also, two or more applications can be executed in the first UI that uses the port monitor. Therefore, even when other application uses a bulk channel of the USB interface, the status information of the image forming apparatus can be received by using the agent program.

FIG. 8 is a view illustrating a source code and an execution order of an agent program according to an embodiment of the present disclosure.

Referring to FIG. 8, the agent program according to an embodiment of the present disclosure initializes server socket information in preparation for communicating with the application of the metro style UI (socket( )). The agent program creates a socket, and assigns an address to the server socket (bind( )). The agent program waits for connection of applications hereinafter, referred to as clients) (listen( )), and sets a maximum number of clients that can connect thereto.

After that, after accepting connection of a client (accept( )), the agent program reads the requested data from a client socket (read( )). The agent program analyzes items that will be queried from the read data (AnalysisRequestXML( )), and queries the status information of the image forming apparatus based on the analyzed information (Exececute-Query ( )).

After that, the agent program transmits the status information to the application of the metro style UI (write( )).

In the logic of the source code as illustrated in FIG. 8, the application of the metro style UI and the agent program need to create a socket for communication. Information necessary to create the socket may be IP addresses and Port information.

FIG. 9 is a view illustrating a data format of a status information request of an image forming apparatus according to an embodiment of the present disclosure.

When requesting status information of the image forming apparatus to the agent program, the application of the metro style UI may transmit the status information request in the extensible markup language (XML) format as illustrated in FIG. 9.

Referring to FIG. 9, the status information of the image forming apparatus may include information for the presence of a duplex printing apparatus, a large-capacity hard disk, a Ram, a finisher, a mail box, and an eco printing, as "Config ID."

The agent program according to an embodiment of the present disclosure may receive the request for the status information of the image forming apparatus in the XML format, and thus, may request the status information of the image forming apparatus.

FIG. 10 is a view illustrating a data format of status information of an image forming apparatus according to an embodiment of the present disclosure.

The agent program according to an embodiment of the present disclosure may process the status information that is received from the image forming apparatus into data having the XML format as illustrated in FIG. 10, and thus, may provide the data to the application of the metro style UI.

In detail, the agent program may receive the status information as "config ID" and/or "Item name" in unprocessed raw data from the image forming apparatus. Accordingly, the agent program needs to process the status information into a data format (for example, XML format) that the application of the metro style UI can recognize, and thus, needs to provide the processed status information.

FIG. 11 is a flowchart illustrating a status information displaying method according to an embodiment of the present disclosure.

Referring to FIG. 11, a hybrid operation system to support a plurality of different types of UIs is executed in a user terminal apparatus in which the hybrid operation system is stored at operation S1110. A first UI that can communicate with an image forming apparatus through a port monitor among the plurality of UIs is displayed at operation S1120.

Here, the image forming apparatus may be connected by a USB interface.

The hybrid operation system may be the WINDOWS 8 operating system, and the first UI may be a metro style UI.

After that, if a user command is input to check status information of the image forming apparatus at operation S1130, the function of the port monitor is stopped, and an agent program that has been previously stored is executed to receive the status information of the image forming apparatus at operation S1140.

Here, the agent program may receive the status information of the image forming apparatus, may process the received status information into a data format capable of being recognized by the first UI, and then, may provide the processed status information to the first UI.

The agent program may access to the image forming apparatus through the control channel of the USB interface.

Also, if a user command is entered, the first UI may provide the user command to the agent program by executing the first application for displaying the status information of the image forming apparatus, and thus, may receive the status information of the image forming apparatus depending on the received user command.

Then, the received status information may be displayed in the first UI at operation S1150.

The first application may receive the received status information from the agent program, and thus, may display the received status information.

In this case, the first application may operate in conjunction with the agent program by a TCP/IP socket.

The status information displaying method of the user terminal apparatus as illustrated in FIG. 11 may be performed in the user terminal apparatus 100 having the configuration as illustrated in FIG. 1. Alternatively, the method may be performed in a user terminal apparatus having different configuration.

As described above, the status information displaying method of the user terminal apparatus 100 according to an embodiment of the present disclosure may receive status information of the image forming apparatus upon user request by using an agent program, and thus, may display correct status information of the image forming apparatus.

Also, two or more applications can be executed in the first UI that uses the port monitor. Therefore, even when other application uses the bulk channel of the USB interface, the first UI can receive the status information of the image forming apparatus by using the agent program.

The above described methods according to such a variety of embodiments may be programmed and stored in each of various storing media. Accordingly, the methods according to the variety of embodiments may be implemented in various types of electronic apparatuses that can execute each of the storing media.

Also, the status information displaying method may be implemented as a program including algorithm that can be run in a computer, and the program may be stored in and provided with a non-transitory computer-readable medium.

The non-transitory computer-readable medium means not a medium to store data for a short moment like a register, a cache, a memory, etc., but a medium that can store data in a semi-permanent and can be read by devices. In detail, the various applications or programs as described above may be stored in the non-transitory computer readable medium, such as a CD, a DVD, a hard disc, a BLU-RAY disc, an USB, a memory card, a ROM, etc., and thus, may be provided to.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A user terminal apparatus, comprising:
a memory to store a hybrid operation system to support a plurality of different types of user interfaces (UIs);
a processor to execute the hybrid operation system;
a display to selectively display one of the plurality of different types of UIs depending on the execution of the hybrid operation system;
USB interface connectable with an image forming apparatus;
a port monitor to perform communication only through a bulk channel of the USB interface; and
an inputter to receive a user command to check status information of the image forming apparatus,
wherein
when a first UI of the plurality of different types of UIs is selected and the user command is input, the processor is to receive the status information of the image forming apparatus while a bulk channel of the USB interface is used to receive information other than the status information simultaneously, by using an agent program which performs communication through a control channel of the USB interface instead of using the port monitor,
the processor is to control the display to display the received status information in the first UI of the plurality of different types of UIs,
the first UI of the plurality of different types of UIs is to communicate with the image forming apparatus only through the port monitor,
the agent program is to receive the status information of the image forming apparatus in a raw data format, to process the received status information in the raw data form into an extensible markup language (XML) format that can be recognized by an application of the first UI, and to transmit the processed status information in the XML format to the first UI.

2. The user terminal apparatus of claim 1, wherein when the user command is input, the processor executes a first application that transmits the user command to the agent program, receives the status information of the image forming apparatus from the agent program, and then, displays the status information of the image forming apparatus in the first UI, and
the first application operates in conjunction with the agent program by a TCP/IP socket.

3. The user terminal apparatus of claim 1, wherein the hybrid operation system comprises a WINDOWS 8 operating system, and
the first UI comprises a metro style UI.

4. A status information displaying method of a user terminal apparatus, which connects with an image forming apparatus by a USB interface, in which a hybrid operation system to support a plurality of different types of user interfaces (UIs) is stored, the status information displaying method comprising:
executing the hybrid operation system;
displaying a first UI that can communicate with the image forming apparatus through a port monitor which performs communication through a bulk channel of the USB interface among the plurality of UIs;
when a user command for checking status information of the image forming apparatus is input, receiving the status information of the image forming apparatus in a raw data format even while the bulk channel of the USB interface is used to receive information other than the status information simultaneously, by using an agent program which performs communication through a control channel of the USB interface instead of the port monitor;

processing, by the agent program, the received status information in the raw data format into an extensible markup language (XML) format that can be recognized by an application of the first UI;

transmitting, by the agent program, the processed status information in the XML format to the first UI; and displaying the received status information in the first UI, wherein the first UI communicates with the image forming apparatus only through the port monitor, and the port monitor is to communicate only through the bulk channel of the USB interface.

5. The status information displaying method of claim 4, wherein:

the receiving the status information of the image forming apparatus comprises, when the user command is input, transmitting the user command to the agent program by executing a first application for displaying the status information of the image forming apparatus in the first UI, and receiving the status information of the image forming apparatus depending on the received user command;

the displaying the received status information comprises allowing the first application to receive and display the received status information from the agent program; and the first application works in conjunction with the agent program by a TCP/IP socket.

6. The status information displaying method of claim 4, wherein the hybrid operation system comprises a WINDOWS 8 operating system; and the first UI comprises a metro style UI.

7. A non-transitory computer-readable medium to contain computer-readable codes as a program to execute the method of claim 4.

8. A user terminal apparatus connectable to an external image forming, apparatus, comprising:

a display to display a first user interface;

a user inputter to receive a user command to check status information of the image forming apparatus;

a port monitor to perform communication only through a hulk channel of the USB interface; and at least one processor to execute:

a metro application to communicate with the image forming apparatus using the port monitor and to receive the user command input from the user inputter, and an agent application to communicate with the image forming apparatus through a control channel of the USB interface according to a control of the metro application, wherein when the user command is input, the metro application is to receive the status information from the image forming apparatus while the bulk channel of the USB interface is used to receive information other than the status information simultaneously, by using the agent application instead of using the port monitor such that the display displays the received status information in the first user interface, the first user interface is to communicate with the image forming apparatus only through the port monitor, the port monitor is to communicate only through the bulk channel of the USB interface, and the agent application is to receive the status information of the image forming apparatus in a raw data form, to process the received status information in the raw data form into an extensible markup language (XML) format that can be recognized by an application of the first UI, and to transmit the processed status information in the XML format to the first UI.

9. The user terminal apparatus of claim 8, wherein the metro application communicates with the image forming apparatus through the port monitor to receive information other than the status information from the image forming apparatus and communicates with the image forming apparatus through the agent application to receive the status information according to the user command to check the status information of the image forming apparatus.

10. The user terminal apparatus of claim 8, further comprising:

a memory to store previous status information of the image forming apparatus, wherein the memory is updated to store the status information received from the image forming apparatus through the agent application.

11. The user terminal apparatus of claim 10, wherein the display displays the received status information rather than the previously stored status information.

12. The user terminal apparatus of claim 8, wherein the received status information is different from previous status information stored before the user command is received.

13. The user terminal apparatus of claim 8, further comprising:

wherein the at least one processor is to prevent the port monitor from communicating with the image forming apparatus to receive the status information through the bulk channel of the USB interface when the user command is received to check the status information.

14. The user terminal apparatus of claim 8, further comprising:

a memory to store the agent application, and wherein the at least one processor is to control the agent application to initiate communication with the image forming apparatus when the user command is received to check the status information of the image forming apparatus.

15. The user terminal apparatus of claim 8, wherein:

the metro application operates before and after the user command is input; and the agent application is loaded to operate when the user command is input to check the status information of the image forming apparatus.

16. The user terminal apparatus of claim 8, wherein the agent application is loaded to a desktop application different from the metro application to perform the communication with the image forming apparatus.

17. The user terminal apparatus of claim 8, wherein the bulk channel of the USB interface receives the information other than the status information is another application which uses the bulk channel of the USE interface, at a same time that the status information is received from the image forming apparatus by using the agent application which communicates with the image forming apparatus through the control channel of the USB interface.

* * * * *

UNITED STATES PATENT AND TRADEMARK OFFICE
CERTIFICATE OF CORRECTION

PATENT NO. : 10,019,208 B2
APPLICATION NO. : 13/940478
DATED : July 10, 2018
INVENTOR(S) : Yoon-gun Lee et al.

Page 1 of 1

It is certified that error appears in the above-identified patent and that said Letters Patent is hereby corrected as shown below:

In the Claims

In Column 12, Line 12, Claim 1, delete "USB" and insert -- a USB --, therefor.

In Column 12, Line 22, Claim 1, delete "a" and insert -- the --, therefor.

In Column 12, Line 33, Claim 1, after "monitor," insert -- and --.

In Column 13, Line 10, Claim 4, delete "UL;" and insert -- UI; --, therefor.

In Column 13, Line 44, Claim 8, delete "forming," and insert -- forming --, therefor.

In Column 13, Line 49, Claim 8, delete "hulk" and insert -- bulk --, therefor.

In Column 14, Lines 34-35, Claim 13, after "claim 8," delete "further comprising:".

In Column 14, Line 60 approx., Claim 17, delete "is" and insert -- via --, therefor.

In Column 14, Line 61 approx., Claim 17, delete "USE" and insert -- USB --, therefor.

Signed and Sealed this
Eleventh Day of December, 2018

Andrei Iancu
*Director of the United States Patent and Trademark Office*